(12) United States Patent
Choo et al.

(10) Patent No.: US 9,827,899 B2
(45) Date of Patent: Nov. 28, 2017

(54) SYSTEM FOR RECOGNIZING LOAD CAPACITY CHANGE AND METHOD OF OPERATING THE SAME

(71) Applicants: HYUNDAI MOTOR COMPANY, Seoul (KR); KIA MOTORS CORPORATION, Seoul (KR); KYUNGSHIN CO., LTD., Incheon (KR)

(72) Inventors: Sung Kwan Choo, Hwaseong-si (KR); Geon Gu Kang, Hwaseong-si (KR); Gwang Seob Kim, Hwaseong-si (KR); Jong Hyeon Choi, Incheon (KR); Dae Hyeon Kim, Bucheon-si (KR)

(73) Assignees: HYUNDAI MOTOR COMPANY, Seoul (KR); KIA MOTORS CORPORATION, Seoul (KR); KYUNGSHIN CO., LTD., Incheon (KR)

( * ) Notice: Subject to any disclaimer, the term of this patent is extended or adjusted under 35 U.S.C. 154(b) by 0 days.

(21) Appl. No.: 15/291,288

(22) Filed: Oct. 12, 2016

(65) Prior Publication Data
US 2017/0203681 A1    Jul. 20, 2017

(30) Foreign Application Priority Data
Jan. 19, 2016    (KR) .................. 10-2016-0006407

(51) Int. Cl.
| | |
|---|---|
| *H05B 33/08* | (2006.01) |
| *B60Q 1/04* | (2006.01) |
| *B60Q 1/26* | (2006.01) |
| *B60Q 11/00* | (2006.01) |
| *H05B 37/02* | (2006.01) |

(52) U.S. Cl.
CPC .................. *B60Q 1/04* (2013.01); *B60Q 1/26* (2013.01); *B60Q 11/00* (2013.01); *H05B 37/02* (2013.01)

(58) Field of Classification Search
CPC . B60Q 1/04; B60Q 1/26; B60Q 16/03; H05B 37/02; H05B 33/08
USPC .............................. 315/77–82, 291, 307, 308
See application file for complete search history.

(56) References Cited

U.S. PATENT DOCUMENTS

| | | | |
|---|---|---|---|
| 8,692,483 B2 | 4/2014 | Weng | |
| 2014/0097758 A1* | 4/2014 | Recker | ............... H05B 37/0272 315/152 |

FOREIGN PATENT DOCUMENTS

| | | |
|---|---|---|
| JP | 2007-302122 A | 11/2007 |
| KR | 10-2002-0093394 A | 12/2002 |
| KR | 10-2011-0063076 A | 6/2011 |
| KR | 10-1061215 B1 | 8/2011 |

(Continued)

OTHER PUBLICATIONS

Office Action Korean Patent Application No. 10-2016-0006407 dated Jan. 26, 2017.
MIC2545A/2549A Datasheet, Micrel Inc., 2000, USA, pp. 1-6.

*Primary Examiner* — Jimmy Vu
(74) *Attorney, Agent, or Firm* — McDermott Will & Emery LLP

(57) ABSTRACT

A system mounted in a vehicle to recognize load capacity change is disclosed. The system includes a lamp, a micro controller unit (MCU) configured to adaptively control the system based on load capacity of the lamp, an intelligent power switch (IPS) having a front end connected to the MCU and a rear end connected to the lamp, and a sensing resistor connected between the MCU and the IPS.

19 Claims, 4 Drawing Sheets

(56) References Cited

FOREIGN PATENT DOCUMENTS

| KR | 10-1382848 B1 | 4/2014 |
| KR | 10-1508346 B1 | 4/2015 |
| KR | 10-2015-0080339 A | 7/2015 |

\* cited by examiner ness and various embodiments thereof, reference will now be
SYSTEM FOR RECOGNIZING LOAD CAPACITY CHANGE AND METHOD OF OPERATING THE SAME

CROSS-REFERENCE TO RELATED APPLICATION

This application claims the benefit of Korean Patent Application No. 10-2016-0006407, filed on Jan. 19, 2016, which is hereby incorporated by reference as if fully set forth herein.

TECHNICAL FIELD

The present disclosure relates to vehicle technology, and more particularly, to a system capable of automatically recognizing load capacity change and a method of operating the same.

BACKGROUND

With rapid development of electronic control technology, various devices operated by a mechanical method in a vehicle are operated by an electrical method for reasons of driver convenience and driving stability and a vehicle system has been gradually enhanced and has become high-tech.

In general, a vehicle may include brake lights which are turned on to indicate braking when a brake pedal is depressed for safe driving and a tail lamp indicating the rear location thereof at night, in addition to a headlight (e.g., a headlamp) used upon night driving.

Headlight high beams may be implemented by mounting a general high-beam lamp or a bi-functional high beam using a solenoid according to vehicle options.

A protection device such as a fuse having a function of automatically breaking a circuit when overcurrent is generated in order to prevent a PCB and a wire of a vehicle from being damaged is required. As the number of electronic devices such as the above-described lamps increases, downsizing and light weight are required. As a device for replacing an existing fuse, a semiconductor and a method for driving and controlling the same using a program have come to the fore. In order to satisfy such requirements, an intelligent power switch (IPS) element may be used for output control, thereby preventing the PCB and the wire from being damaged.

The IPS is a semiconductor chip which replaces a fuse, a relay, etc. and has a function for feeding information on current supplied to a load back to a micro controller unit (MCU). The IPS serves to automatically block a load power supply when overcurrent is generated, thereby protecting a system. In a load operation system using the IPS, a fuse and relay occupying a large space in an existing system may be replaced with a small semiconductor chip (IPS).

FIGS. 1A and 1B show a system for controlling a headlight according to the related art. As shown in FIG. 1A, the IPSs are respectively provided in lamps (a headlight high beam and a bi-functional solenoid) (IPS_1 and IPS_2). As shown in FIG. 1B, when one IPS is provided (IPS_1), a separate option circuit 10 for distinguishing the kind of the lamp is required. An IPS is further required in FIG. 1A and an option circuit is further required in FIG. 1B, thereby increasing the size and cost of the system.

Therefore, there is a need for enhanced technology.

Patent Document

Korean Registration Patent Publication 10-1382848 (Apr. 8, 2014)

SUMMARY

Accordingly, the present disclosure is directed to a system capable of automatically recognizing load capacity change and a method of operating the same that substantially obviate one or more problems due to limitations and disadvantages of the related art.

An object of the present disclosure is to provide a system capable of automatically recognizing load capacity change using one IPS regardless of various kinds of lamps and a method of operating the same.

Another object of the present disclosure is to provide a system for recognizing load capacity change, which is capable of making better use of a space and improving price competitiveness, and a method of operating the same.

Another object of the present disclosure is to provide a system for recognizing load capacity change, which is capable of appropriately setting a micro controller unit (MCU) according to the kind of a lamp, and a method of operating the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a system mounted in a vehicle to recognize load capacity change includes a lamp, a micro controller unit (MCU) configured to adaptively control the system based on load capacity of the lamp, an intelligent power switch (IPS) having a front end connected to the MCU and a rear end connected to the lamp, and a sensing resistor connected between the MCU and the IPS.

The aspects of the present disclosure are only part of the preferred embodiments of the present disclosure, and various embodiments based on technical features of the present disclosure may be devised and understood by one of ordinary skill in the art based on the detailed description of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessing" another element, one element may be "connected to", "coupled to", or "access" another element via a further element although one element may be directly connected to or directly access another element.

The term "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless obviously defined in the present invention, such terms are not interpreted as ideal or excessively formal meanings.

Hereinafter, various embodiments of the present invention will be described with reference to the drawings.

Figure 1A:
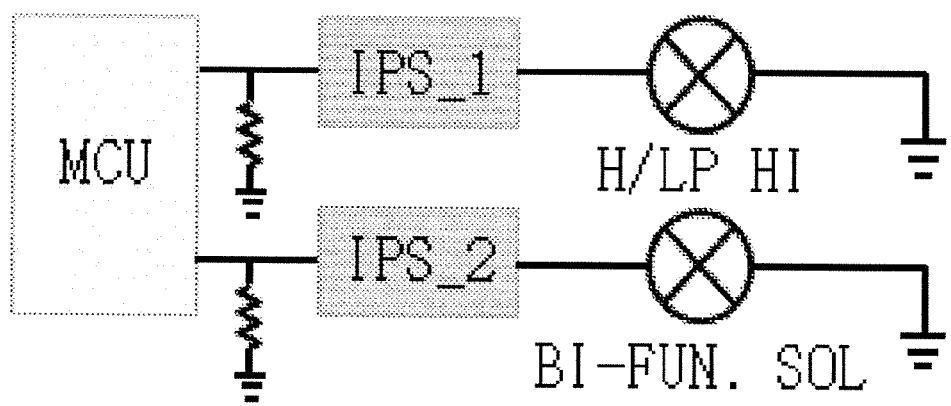
FIGS. 1A and 1B are diagrams showing a system for controlling lamps according to the related art.
Figure 1B:
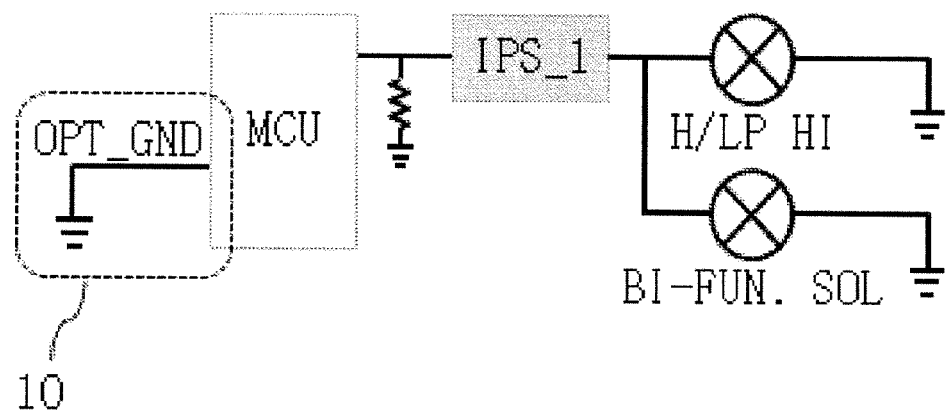
Figure 2:
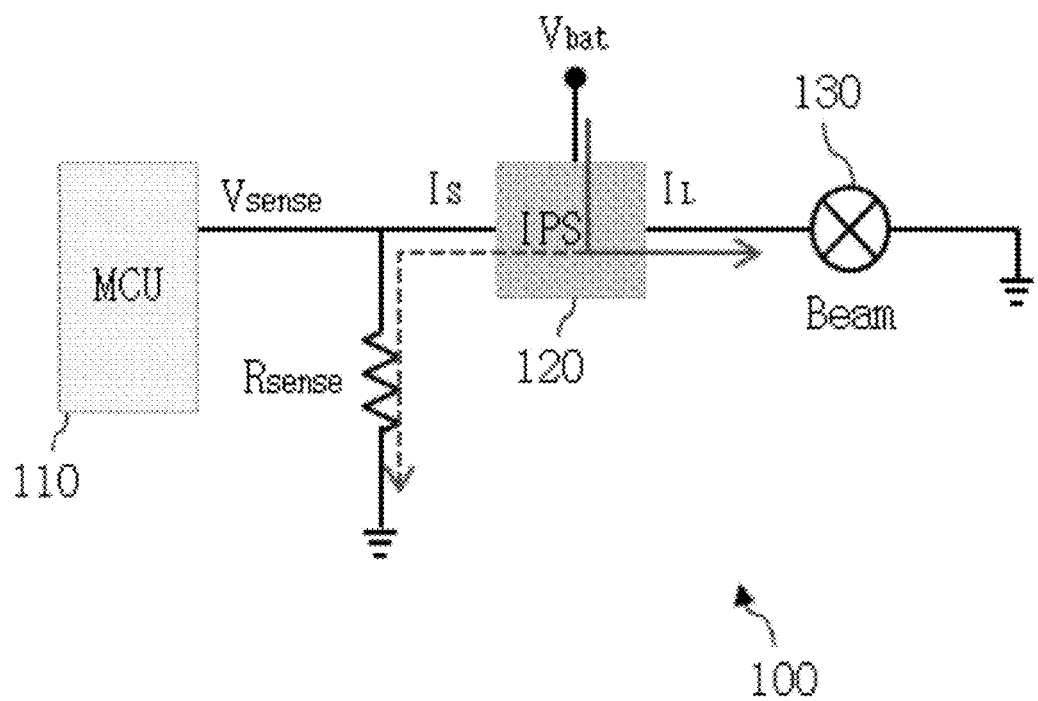
FIG. 2 is a diagram showing a system for recognizing load capacity change according to an embodiment.

FIG. 2 is a diagram showing a system for automatically recognizing load capacity change according to an embodiment.

In FIG. 2, the system 100 may include a micro controller unit (MCU) 110, an intelligent power switch (IPS) 120, a beam 130 and a resistor Rsense. Here, Is is sensing current and IL is output current.

The system 100 is supplied by a voltage Vbat via a battery.

The beam 130 corresponds to a load and the beam 130 may be any one of a headlight beam, a bi-functional solenoid beam or a privately made bulb. Alternatively, several beams may be connected to the IPS 120. Even when several beams are connected to one IPS 120, the system 100 may normally operate.

The IPS 120 is a semiconductor chip which replaces a fuse, a relay, etc. and has a function of feeding information on the value of current supplied to a load (e.g., a headlight) back to the MCU 110. The same IPS 120 may be used although any one of the headlight beam, the bi-functional solenoid beam or the privately made beam is used as the beam 130. Since another IPS is not further provided or an option circuit is not required, the present invention can reduce cost and space, as compared to the related art.

The MCU 110 is a module for controlling the system 100 and controls the IPS and measures Vsense to perform operation corresponding thereto.

The MCU 110 measures Vsense (Is) via the IPS after an interval of an inrush period. A detailed description thereof will be given with reference to FIG. 3.

Figure 3:
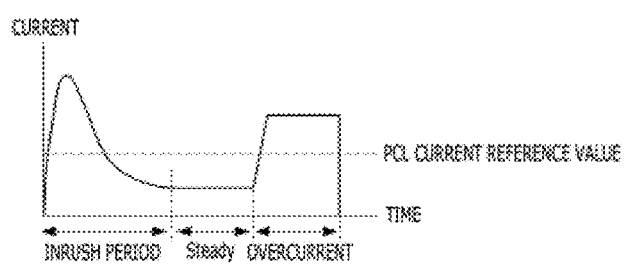
FIG. 3 is a graph showing an output current value of an IPS of a system for recognizing load capacity change according to an embodiment with time.

Referring to FIGS. 2 and 3, the MCU 110 sets a programmable current limit (PCL). The PCL is a reference current value for blocking overcurrent which may be generated in a load of a next stage. Although the PCL value may be set to twice normal current in the present specification, the PCL value may be differently set.

The MCU 110 may store the PCL, an output current value and a below-described OCL value in an internal memory.

A current value greater than a PCL value may be measured at the MCU 110 in the inrush period immediately after the voltage is supplied via the battery. The MCU 110 may not use the current value of this period. The inrush period may be about 1 second without being limited thereto.

The MCU 110 measures a meaningful current value in a steady period. The MCU 110 blocks overcurrent when overcurrent is generated. The MCU includes a logic for blocking overcurrent in software.

The MCU 110 may set an open current limit (OCL) value. The OCL may be a software value for sensing whether a circuit connected to a load is disconnected using a program. The OCL value may be set to ¼ of normal current without being limited thereto.

Returning to FIG. 2 again, the MCU 110 may measure a value Vsense after the inrush period and determine the kind of the load. The MCU 110 may determine the kind of the load according to the value Vsense. In general, normal current of the headlight high beam is about 4 A to 6 A, normal current of the bi-functional solenoid may be 0.5 A to 1.0 A and normal current of the privately made bulb may exceed 7 A.

The MCU 110 may determine the kind of the load. The above-described numerical values may increase/decrease.

Table 1 below shows examples of normal current, the PCL value and the OCL value according to the load, which may be stored in a memory and used by the MCU 110.

TABLE 1

| Kind of load | Normal current | PCL | OCL |
|---|---|---|---|
| Headlight high beam | 5A | 10A | 1.25A |
| Bi-functional solenoid | 0.7A | 1.4A | 0.18A |

The MCU 110 may store the PCL and OCL values which vary according to the kind of the lamp. In addition, the MCU 110 may determine overcurrent via the PCL and determine whether a circuit is disconnected via the OCL, even when normal current of the privately made bulb exceeds 10 A.

The MCU 110 may obtain output current using the following equation. The MCU 110 may obtain output current IL by detecting a voltage when sensing current Is flows in a sensing resistor Rsense based on a proportional constant K.

$$K = IL/Is, \quad Vsense = Rsense*Is = Rsense*(IL/K),$$
$$IL = (Vsense*K)/Rsense$$

where, K is a proportional constant.

Figure 4:
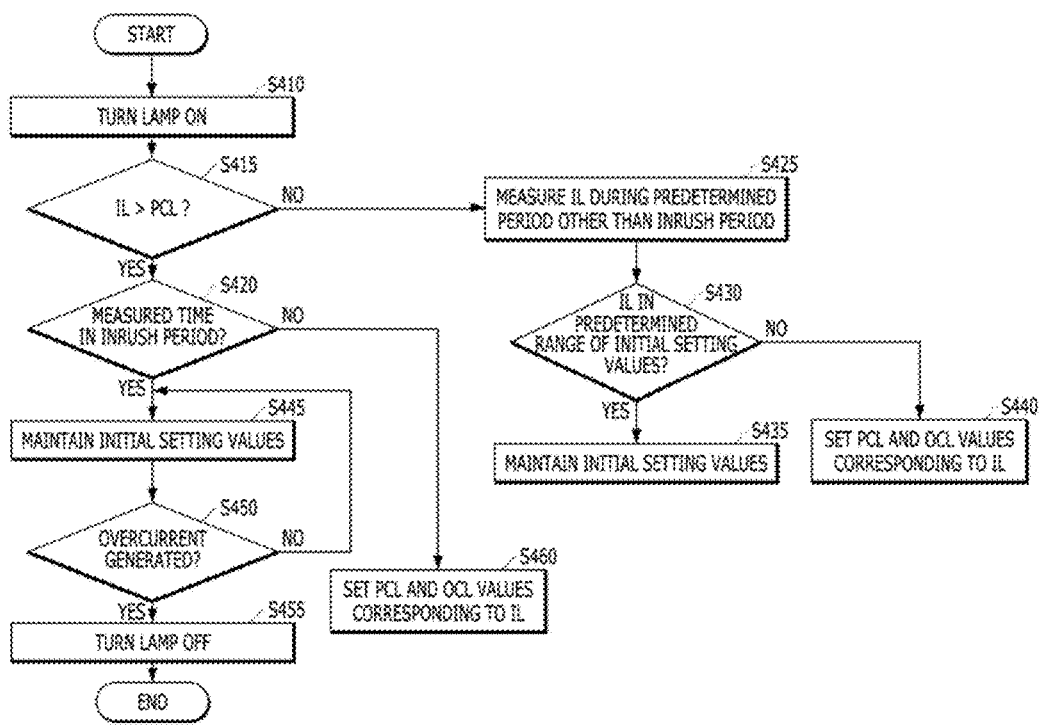
FIG. 4 is a sequence diagram showing a method of operating a system for recognizing load capacity change according to an embodiment.

Hereinafter, a method of operating a system for recognizing load capacity change will be described with reference to FIGS. 2 and 4.

The system 100 turns the lamp on (S410).

The MCU 110 may initially set the IL, PCL and OCL values. The MCU 110 may initially set the IL, PCL and OCL based on the headlight high beam. For example, the MCU 110 may set the IL value to 5V, set the PCL value to 10 A and set the OCL value to 1.25 A. The MCU 110 may set initial setting values based on different kinds of lamps.

Although it is determined that the measured IL value is greater than the PCL value (S415), the MCU 110 maintains the initial setting values (S445) when measurement is performed in the inrush period (S420). Thereafter (after the inrush period), when overcurrent is generated (S450) (via the PCL value), the MCU 110 turns the lamp on.

Even when the IL value is equal to or less than the PCL value (S415), the MCU 110 may measure IL during a predetermined period other than the inrush period (S425). The MCU 110 may measure the IL value during, for example, 1 second.

In this case, the MCU 110 maintains the initial setting values (IL, PCL and OCL) (S435) if the IL value is in a predetermined range of the initial setting values (S430) and re-sets the PCL and OCL values corresponding to the measured IL value (S440) when the IL value is outside of the predetermined range of the initial setting values.

The MCU 110 may use only one IPS regardless of the kind of the lamp.

Although three kinds of lamps are described as a load, these are merely exemplary and one IPS may be used in a circuit for controlling more lamps.

The embodiments of the present invention may include the following effects.

First, by providing a system for recognizing load capacity change using one IPS regardless of the various kinds of lamps for performing the same functions, it is possible to improve device efficiency.

Second, by providing a system for recognizing load capacity change, it is possible to make better use of a space and improve price competitiveness.

Third, by providing a system for recognizing load capacity change, which is capable of protecting a circuit even when a lamp having unknown capacity is mounted in a vehicle, it is possible to improve device stability/efficiency.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The method according to the foregoing embodiments may be implemented as a program executed in a computer and recorded on a computer-readable recording medium. Examples of the computer-readable recording medium include a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Accordingly, the above detailed description is not to be construed as limiting the present invention in all aspects and be considered by way of example. The scope of the present invention should be determined by reasonable interpretation of the accompanying claims and all equivalent modifications made without departing from the present invention should be included in the following claims.

What is claimed is:

1. A system mounted in a vehicle to recognize load capacity change, the system comprising:
   a lamp;
   a micro controller unit (MCU) configured to adaptively control the system based on load capacity of the lamp;
   an intelligent power switch (IPS) having a front end connected to the MCU and a rear end connected to the lamp; and
   a sensing resistor connected between the MCU and the IPS,
   wherein the MCU measures an output current value IL in a steady period, recognizes change of a load capacity of the lamp, and re-sets predetermined setting values based on the change of the load capacity.

2. The system according to claim 1, wherein the MCU:
   measures the output current value IL via the IPS when a battery is turned on to turn the lamp on,
   maintains a predetermined setting value when the measured output current value is greater than a programmable current limit (PCL) value, and
   controls the lamp to be turned off upon determining that the output current value causes overcurrent after an inrush period.

3. The system according to claim 2, wherein the MCU maintains the setting value when the measured output current value is measured in the inrush period.

4. The system according to claim 2, wherein the MCU re-measures the output current value during a predetermined time in the steady period when the measured output current value is equal to or less than the PCL value.

5. The system according to claim 4, wherein the MCU maintains the predetermined setting value when the re-measured output current value is in a predetermined range of the predetermined setting value.

6. The system according to claim 4, wherein, when the re-measured output current value is outside of a predetermined range of the predetermined setting value, the predetermined setting value is changed based on the re-measured output current value.

7. The system according to claim 6, wherein the MCU sets the re-measured output current value as an output current value and re-sets PCL and OCL values based on the re-measured output current value.

8. The system according to claim 2, wherein the predetermined setting value includes at least one of the output current value, a PCL value corresponding to the output current value, and an open current limit (OCL) value corresponding to the output current value.

9. The system according to claim 8, wherein the output current value IL is obtained by the following equation:

$$IL = (V\text{sense} * K) / R\text{sense}$$

wherein Vsense denotes a voltage detected when sensing current Is flows in the sensing resistor having a resistance of Rsense and K denotes IL/Is.

10. The system according to claim 9, wherein the PCL value is set in a predetermined range of IL*2.

11. The system according to claim 9, wherein the OCL value is set in a predetermined range of IL*0.25.

12. The system according to claim 2, further comprising a memory,
wherein the MCU stores the predetermined setting value in the memory.

13. A method of operating a system for recognizing change of a load capacity, the method comprising:
measuring an output current value IL of an intelligent power switch (IPS) when a lamp is turned on;
maintaining a predetermined setting value when the measured output current value is greater than a programmable current limit (PCL) value; and
turning the lamp off upon determining that the output current value causes overcurrent after an inrush period.

14. The method according to claim 13, wherein the maintaining the predetermined setting value includes measuring the output current value in the inrush period.

15. The method according to claim 13, further comprising re-measuring the output current value during a predetermined time in a steady period when the measured output current value is equal to or less than the PCL value.

16. The method according to claim 15, further comprising maintaining the predetermined setting value when the re-measured output current value is in a predetermined range of the predetermined setting value.

17. The method according to claim 15, further comprising changing the predetermined setting value based on the re-measured output current value when the re-measured output current value is outside of a predetermined range of the predetermined setting value.

18. The method according to claim 17, wherein the changing the predetermined setting value further includes setting the re-measured output current as an output current value and re-setting PCL and open current limit (OCL) values based on the re-measured output current value.

19. The method according to claim 18, wherein the output current value IL is obtained by the following equation:

$$IL = (V\text{sense} * K)/R\text{sense}$$

wherein Vsense denotes a voltage detected when sensing current Is flows in a sensing resistor having a resistance of Rsense and K denotes IL/Is.

* * * * *